United States Patent [19]

Rupert

[11] 4,007,243
[45] Feb. 8, 1977

[54] METHOD OF BLOW MOLDING
[75] Inventor: Samuel J. Rupert, Ann Arbor, Mich.
[73] Assignee: Hoover Ball and Bearing Company, Saline, Mich.
[22] Filed: Aug. 18, 1975
[21] Appl. No.: 605,235

Related U.S. Application Data

[63] Continuation of Ser. No. 445,566, Feb. 25, 1974, abandoned.

[52] U.S. Cl. .................................. 264/89; 264/98; 264/296; 264/334; 425/DIG. 215; 425/DIG. 232
[51] Int. Cl.² .......................................... B29C 17/07
[58] Field of Search ............. 264/161, 163, 89, 90, 264/92, 94, 96, 98, 99, 294, 296, 334, 335; 425/302 B, 296, 298, 308, DIG. 206, 211, 213, 212, 215, 216, 232, 326 B, 387 B

[56] References Cited

UNITED STATES PATENTS

| | | | |
|---|---|---|---|
| 2,128,239 | 8/1938 | Ferngren | 264/98 |
| 3,114,932 | 12/1963 | Donnelly | 264/98 |
| 3,278,666 | 10/1966 | Donald | 264/98 |
| 3,329,996 | 7/1967 | Marcus et al. | 264/98 X |
| 3,718,724 | 2/1973 | Holzmann et al. | 264/98 |
| 3,752,627 | 8/1973 | Bourgeois et al. | 425/298 |
| 3,781,395 | 12/1973 | Uhlig | 264/98 X |

Primary Examiner—Jan H. Silbaugh
Attorney, Agent, or Firm—Olsen and Stephenson

[57] ABSTRACT

An improved method of blow molding thermoplastic articles of superior physical properties by orienting the material during the formation of the articles. A two-stage blowing operation is provided wherein a tubular parison is extruded at a preblowing station spaced from a separate final blowing station and simultaneously a previously blown preform is supported on a blow pin at the final blowing station. A preform blow mold is closed on the tubular parison while a final blow mold is closed on the previously blown preform and the enclosed tubular parison and preform are blown to the shapes of the enclosing molds. The blow pin is then retracted from the final blow mold, and the molds are shifted so that the preform blow mold is at the final blowing station, and the final blow mold is at a discharge station. The blow pin is then inserted into the mold at the final blowing station so that the preform in the mold will be supported on the blow pin. Both molds are then opened and are shifted back to the preblowing and final blowing stations, and the cycle is repeated. The preform is conditioned both thermally and dimensionally in the molds for most effective orientation during the final blowing operation.

3 Claims, 13 Drawing Figures

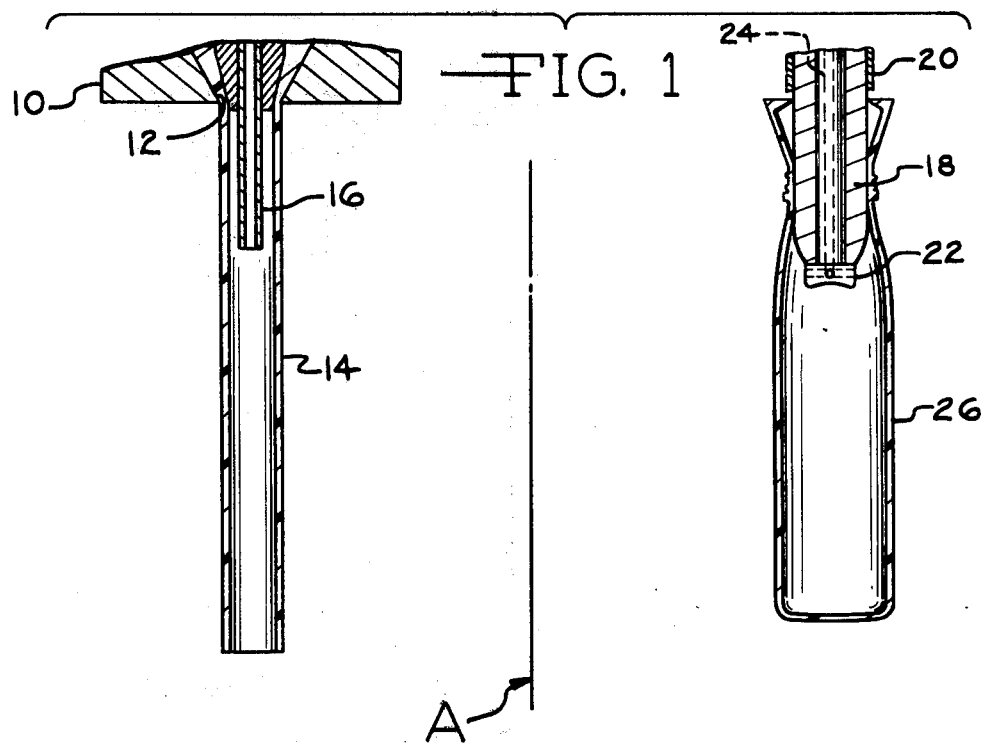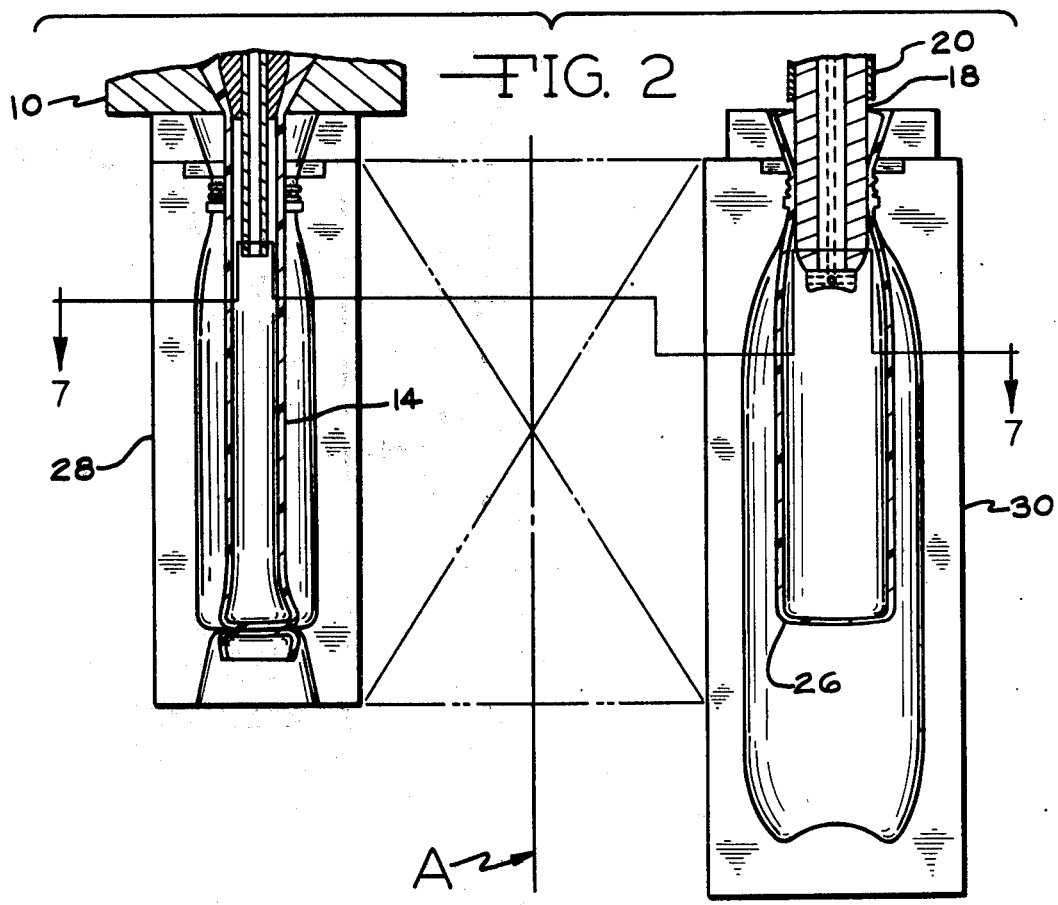

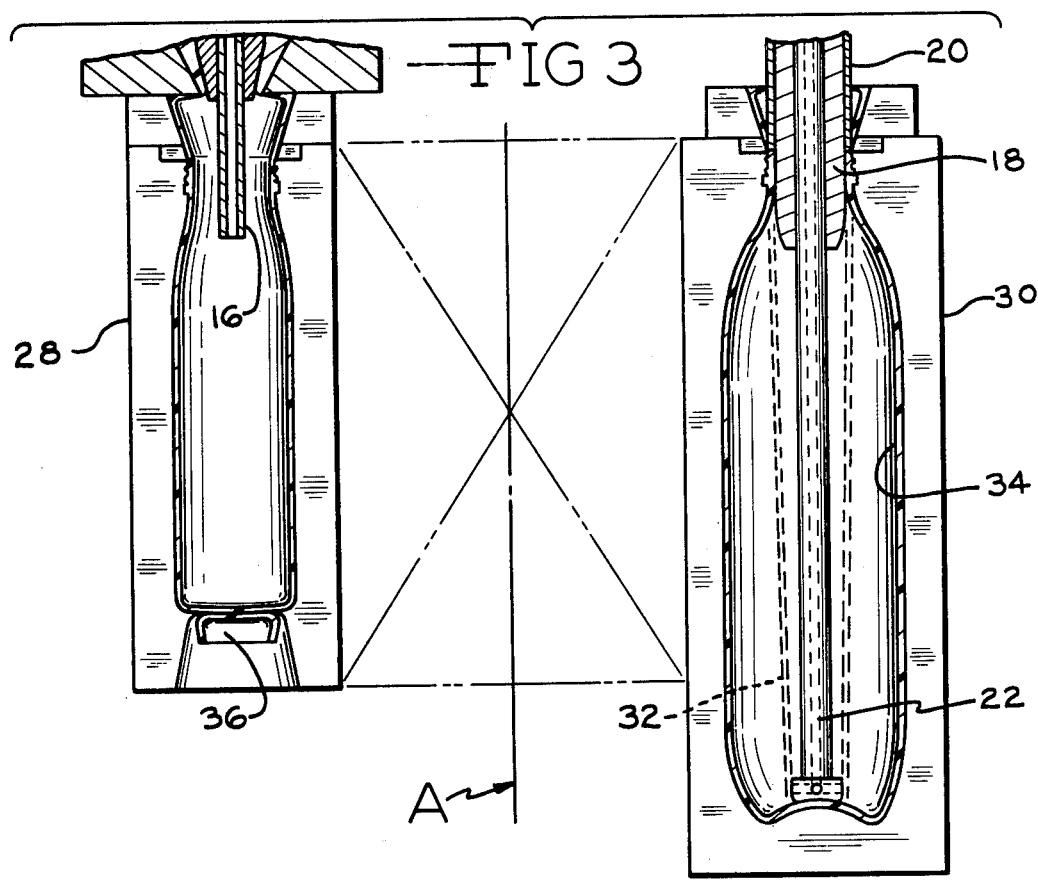
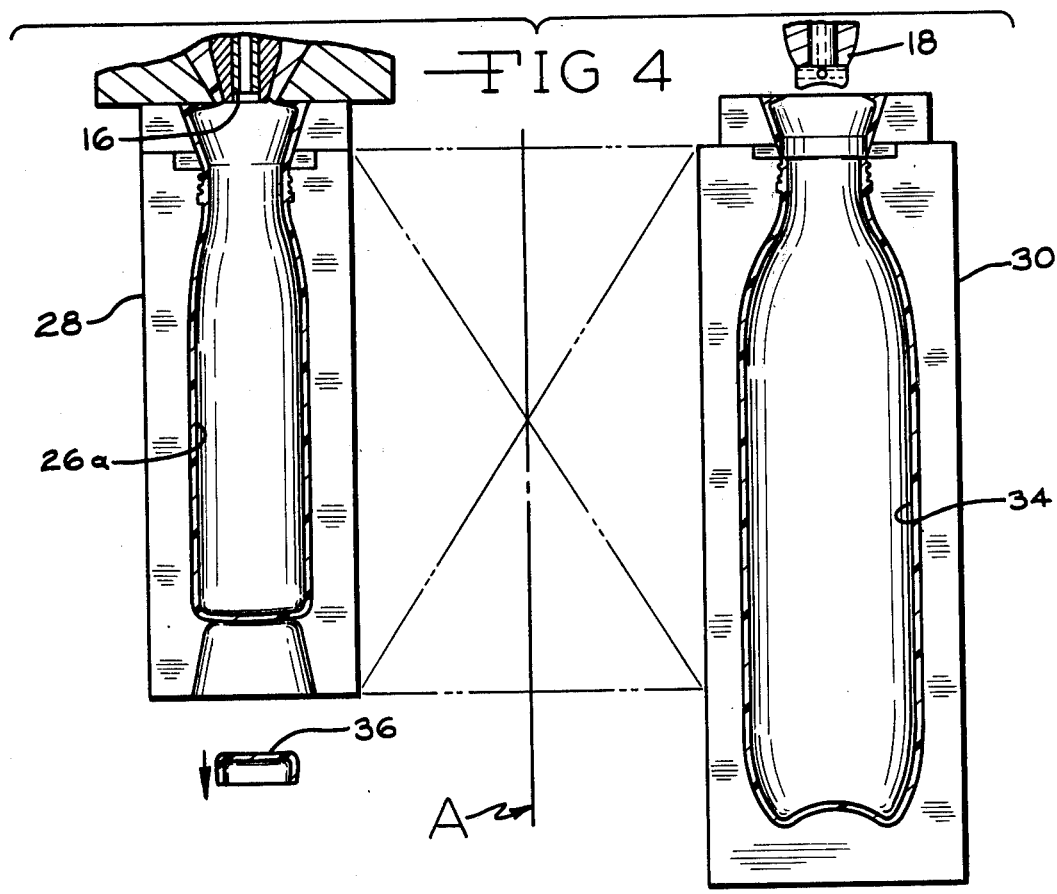

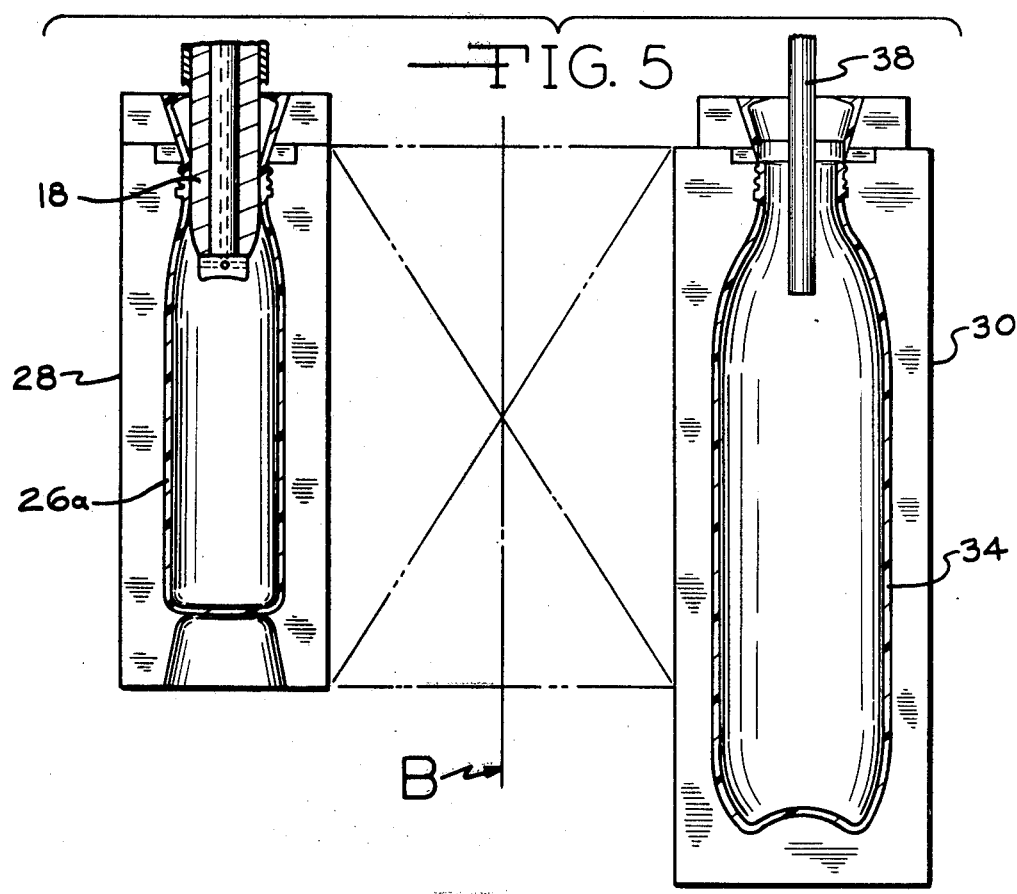
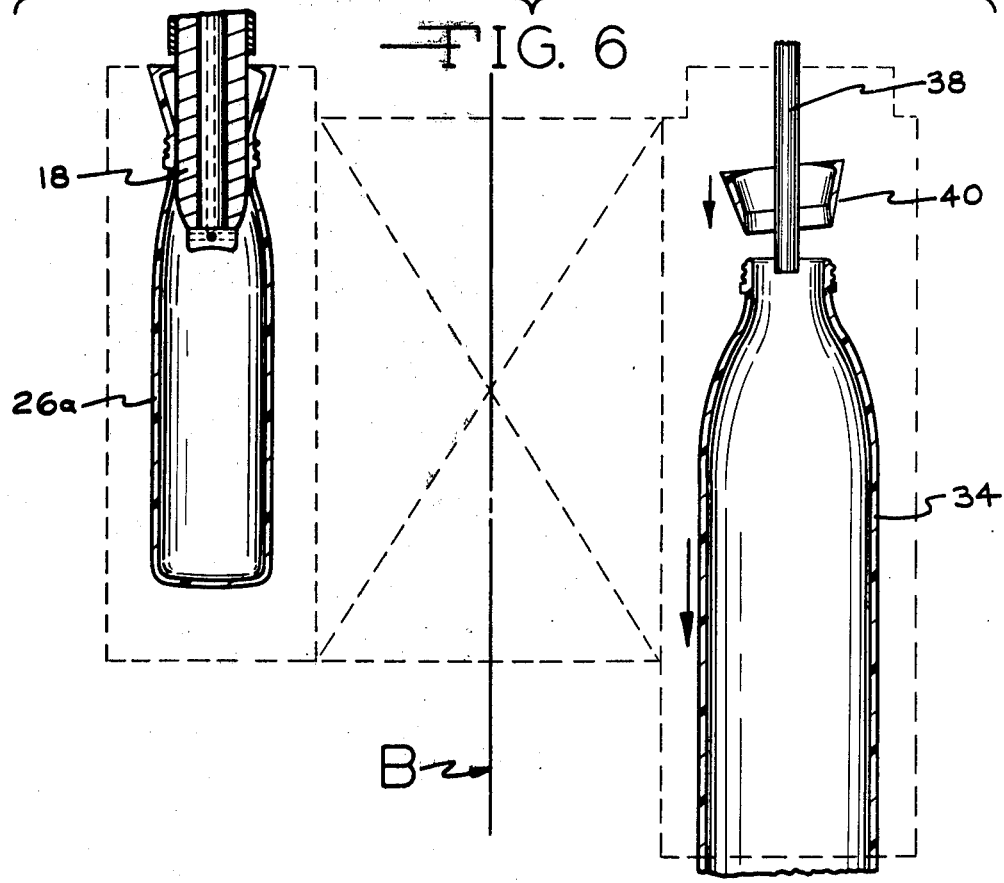

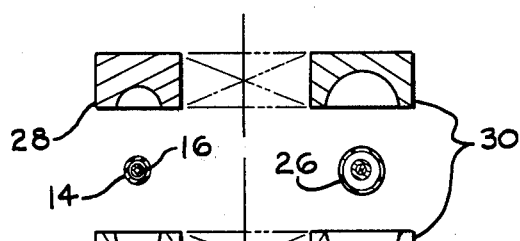
FIG. 7
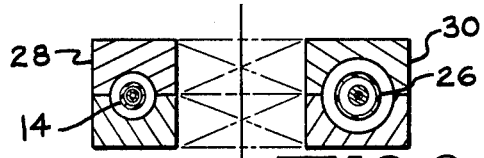
FIG. 8
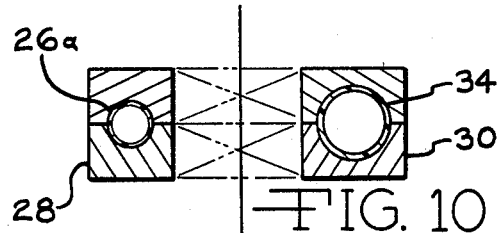
FIG. 9
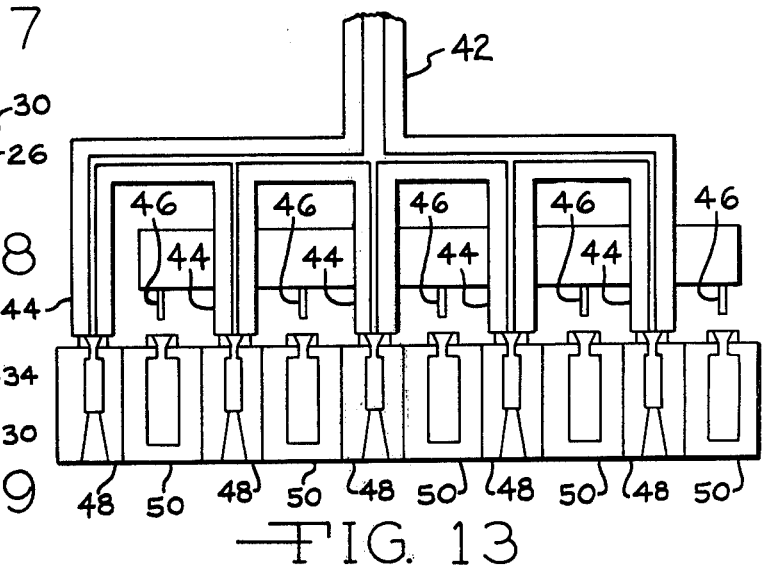
FIG. 13
FIG. 10
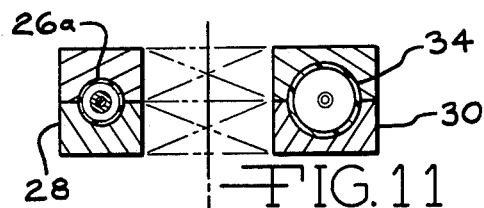
FIG. 11
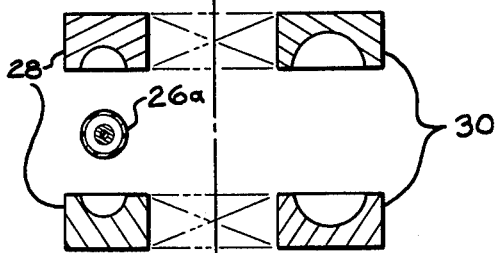
FIG. 12

METHOD OF BLOW MOLDING

REFERENCE TO PENDING APPLICATION

This application is a continuation of pending application Ser. No. 445,566, filed Feb. 25, 1974 in the name of Samuel J. Rupert for "Method of Blow Molding", now abandoned.

BACKGROUND OF THE INVENTION

The present invention relates to an improved method of forming blown plastic articles wherein biaxial orientation of the thermoplastic material occurs during the formation of the blown article.

Advantages of biaxial orientation of thermoplastic material are well known and are set forth in the prior art, for example, in U.S. Pat. Nos. 3,470,282 and 3,767,747 and the references cited therein. Efforts have recently been made to utilize the phenomenon of biaxial orientation of thermoplastic material in conjunction with conventional blow molding machines. One such effort is disclosed in aforesaid U.S. Pat. No. 3,767,747 in which a blow molding method is proposed that is particularly adapted for utilization for the so called "free extrusion" blow molding machines wherein a pendent tube of thermoplastic material is issued from a downwardly facing orifice.

SUMMARY OF THE INVENTION

The present invention is directed to improvements over prior teachings such as those that are found in aforesaid U.S. Pat. No. 3,767,747. More particularly, the present invention is directed to a blow molding method for effectively utilizing the so called intermittent "free extrusion" blow molding machines so that cycle time is minimized, larger production per machine can be realized, and tooling and production costs are kept at a minimum. In carrying out the present invention, a free extrusion blow molding machine is used which has an extrusion orifice from which a pendent tubular parison can be extruded. The tubular parison is then enclosed in a preform mold positioned at the extrusion orifice and having an interior cavity with smaller dimensions but conforming generally to the desired shape of the finished article. The tubular parison is blown to the shape of the preform mold cavity while the preform mold remains closed at the extrusion orifice. The mold enclosed preform is then shifted from the orifice to a blowing station spaced from the annular extrusion orifice. A blow pin is inserted into the mold enclosed preform so that the preform will be supported on the blow pin, and the preform mold is then opened leaving the preform supported on the blow pin. The preform is then enclosed in a final blow mold having an interior cavity conforming to the shape of the desired article, and the preform is then blown to the shape of the final article.

In a preferred method of operation, the preform mold and the final blow mold will be mounted in fixed relation with respect to each other so that a previously blown preform can be supported on the blow pin at the final blowing station at the same time that the next succeeding pendent tubular parison is being extruded at the annular extrusion orifice. Thereafter, the preform blow mold and the final blow mold can be simultaneously closed on the pendent tubular parison and the previously blown preform and the pendent tubular parison can be blown to the shape of the preform mold while the previously blown preform is blown to the shape of the final blow mold. The pair of molds can then be moved simultaneously so that the preform blow mold is located at the final blowing station and the final blow mold is located at a discharge station. Both molds can then be opened, discharging the finished article at the discharge station and leaving the preform supported on the blow pin at the final blowing station. The open molds can then be returned to the extrusion station and the final blowing stations respectively, and again closed on the succeeding pendent tubular parison and the preform supported on the blow pin at the final blowing station. The cycle can again be repeated.

It is also contemplated that a plurality of similar molds can be positioned at a plurality of extrusion orifices all receiving plastic material from the common extruder of one blow molding machine. Thus, a plurality of articles can be formed simultaneously from a single blow molding machine.

If it is desired, separate axial and radial orientation of the preform can occur at the final blowing station by utilizing a core element in the blow pin for axially stretching the preform prior to the blowing step at which time the axially stretched preform will be radially stretched. It will be understood that suitable heating and cooling means will be associated with the molds to assure that the plastic material is at the proper temperatures during the various steps of orienting the plastic material during the formation of the articles. These temperature conditions are well known in the art, and the means for cooling or heating the molds also are well known in the art, and therefore they will not be discussed in detail.

Other objects of this invention will appear in the following description and appended claims, reference being had to the accompanying drawings forming a part of this specification wherein like reference characters designate corresponding parts in the several views.

DESCRIPTION OF THE DRAWINGS

FIG. 1 is a fragmentary vertical section taken through the preblowing station and the final blowing station of a blow molding machine illustrating a pendent tubular parison extruded from the extrusion orifice at the preblowing station and a previously blown preform supported on a blow pin at the final blowing station;

FIG. 2 is a view similar to that of FIG. 1, showing the preform blow mold closed on the pendent tubular parison and the final blow mold is closed on the previously blown preform;

FIG. 3 is a view similar to that of FIG. 2, showing new preform and a finished article blown at the preblowing and final blowing stations;

FIG. 4 is a view similar to that of FIG. 3, showing the blow pins at the preblowing and final blowing stations retracted from the mold cavities;

FIG. 5 is a view similar to that of FIG. 4, showing the molds after they have been shifted to the final blowing station and the discharge station, and showing the blow pin at the final blowing station reinserted into the new preform;

FIG. 6 is a view similar to FIG. 6, but with the molds open;

FIGS. 7–12 are reduced fragmentary horizontal sections taken on the lines 7—7 of FIG. 2, corresponding to the positions of the molds in FIGS. 1–6, respectively; and FIG. 13 is a schematic illustration of apparatus for producing five blown articles simultaneously by the present invention.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring now to the drawings, the invention will be described in greater detail with attention being directed first to FIGS. 1 and 7. The extrusion head 10 of a conventional so called free extrusion blow molding machine includes the annular extrusion orifice 12 from which a pendent tubular parison 14 has been extruded. A conventional blow pin 16 is shown in its extended position in preparation for blowing purposes. Laterally spaced from the extrusion head 10 is a final blow pin 18 which is mounted for selected reciprocating axial movement by pneumatic cylinder means, not shown. A sleeve 20 encloses the final blow pin 18 and is mounted for reciprocal movement relative to the blow pin 18 for use in providing a neck finish on a blown article, as will be explained hereinafter. The final blow pin 18 includes a core element 22 which has duct means 24 for passage of a blowing medium, such as air. The core element 22 may be extended axially relative to final blow pin 18 if this is desired for axially stretching a preform as a step in the blow molding operation. Supported on the final blow pin 18 is a previously blown preform 26.

Shown in FIG. 7 in their open positions are the mold sections of the preform blow mold 28 and the final blow mold 30. These mold sections are mounted together for movement in unison so that the molds 28 and 30 open and close at the same time, and also so that they can be shifted laterally together, either in their open or closed positions.

For reference purposes in the drawings, broken lines A and B are used, reference line A being located between the preblowing station at the extrusion orifice 12 and the final blowing station at the final blow pin 18. Reference line B is located between the final blowing station and a discharge station laterally spaced from the final blowing station. The discharge station is spaced laterally from the final blowing station the same distance that the final blowing station is spaced from the preblowing station so that when the molds 28, 30 are shifted laterally, if one of the molds 28, 30 is located at the final blowing station the other of the molds 28, 30 will be located either at the preblowing station or at the discharge station. Thus, as shown in FIGS. 7–10, the preform mold 28 is located at the preblowing station and the final mold 30 is located at the final blowing station, and in FIGS. 11 and 12, the preform mold 28 is located at the final blowing station and the final mold 30 is located at the discharge station.

The cycle of operation will now be described beginning with reference initially to FIGS. 1 and 7, it being understood that the preform 26 supported on the final blow pin 18 is supported thereon from the immediately preceding cycle of operation. With the molds 28, 30 in their open positions, the pendent tubular parison 14 is extruded and the molds 28, 30 are then closed simultaneously enclosing the pendent tubular parison 14 and the preform 26 as is shown in FIGS. 2 and 8. Immediately upon closing the molds 28, 30, the enclosing tubular parison 14 is blown to the shape of the cavity of the preform blow mold 28, and the preform 26 enclosed in final blow mold 30 may be blown directly to the shape of the cavity of the final blow mold 30 or it can initially be stretched axially by the core element 22 to the shape shown generally by broken lines 32 and then blown to the shape of the final blow mold 30, all of which can be seen in FIG. 3. The blown article 34 will have been formed from the preform 26 by axial stretching and radial stretching in both modes of operation. The sleeve 20 will be lowered to trim and finish the neck portion of the blown article 34 in the conventional manner.

Prior to shifting the blow molds 28, 30, the blow pins 16 and 18 are withdrawn therefrom as is shown in FIG. 4, and the waste material 36 is trimmed from the lower end of newly formed preform 26a, as is shown in FIG. 4.

The closed molds 28, 30 with the enclosed preform 26a and finished article 34 are next shifted laterally to the final blowing and discharge stations as shown in FIGS. 5 and 11, and upon arrival at these stations, the blow pin 18 is inserted into the preform mold 28 and into the neck portion of the preform 26a so that the latter will be supported on blow pin 18 when the mold 28 is subsequently opened. At the time of inserting blow pin 18 into preform 26a, a rod 38 is inserted into the open end of blown container or article 34 after which the molds 28 and 30 are opened causing article 34 to be discharged from mold 30 as shown in FIG. 6. The rod 38 assures that the article 34 and the waste material 40 will be removed from the opposite sections of mold 30 when it is opened. The molds 28 and 30 are now shifted back again to the preblow and final blow stations and the cycle is repeated.

The present invention is particularly suitable for high volume production from a single blow molding machine. If desired, a plurality of sets of preform and final blow molds can be mounted together and moved in unison, such as is shown schematically, for example, in FIG. 13. As there shown, an extruder 42 is arranged to discharge through five extrusion heads 44, which may be constructed the same as extrusion head 10. Adjacent thereto are a plurality of blow pins 46, which may be constructed and actuated the same as blow pin 18 and its associated parts. The preform blow molds 48 and the final blow molds 50 can be constructed the same as molds 28 and 30, respectively. Thus, the same cycle of operation described with respect to FIGS. 1–12 can be employed with a multiple-head blow molding machine, such as the five-head machine in FIG. 13, thereby producing articles at five times the rate of a single-head machine. The ejection station in this case could be the adjacent extrusion station and pins 16 and 38 would become one and the same. Furthermore, when practicing the present invention with multiple-head machines, high volume production can be achieved without substantial increases in cost for tooling and without significant increases in space requirements for the blow molding machine and its associated tooling.

It will be understood that when practicing the present invention that the time of cooling of the preform accomplished in the preform mold and other time and temperature parameters adopted during the cycle that are most conducive to obtaining optimum results by orientation of the plastic material during the formation of the article will be utilized. These parameters are readily found in the prior art, such as the United States Letters Patent cited above, for example.

It is claimed:

1. In a method of blow molding a thermoplastic article from a blow moldable thermoplastic material, the steps of extruding a tubular parison of said material at a preblowing station spaced laterally from a separate final blowing station and simultaneously supporting a previously blown preform on a blow pin at said final blowing station, closing a preform mold on the tubular parison while closing a final blow mold on the previously blown preform, immediately upon closing the molds blowing the tubular parison to the shape of the preform blow mold, blowing the preform to the shape of the final blow mold, retracting the blow pin from the mold at said final blowing station, shifting both molds laterally so that the preform blow mold is at said final blowing station and the final blow mold is at a discharge station, inserting the blow pin into the mold at said final blowing station and inserting a pin into the blown article in the mold at said discharge station, opening both molds while supporting the blown preform on the blow pin at the final blowing station and while maintaining the pin in the blown article at said discharge station, thereby assuring that the blown article is removed from the final blow mold, returning both molds laterally to their initial open positions, and repeating the steps.

2. In a method of blow molding a thermoplastic article from a blow moldable thermoplastic material, the steps of extruding a pendent tubular parison of said material from an annular orifice at a preblowing station spaced laterally from a separate final blowing station and simultaneously supporting a previously blown preform on a blow pin with a movable core element at said final blowing station, closing a preform blow mold on the pendent tubular parison at said annular orifice while simultaneously closing a final blow mold on the previously blown preform at the final blowing station, blowing the pendent tubular parison to the shape of the preform blow mold, concurrently axially stretching said previously blown preform by axially moving said core element and radially stretching the axially stretched preform by blowing the preform to the shape of the final blow mold, retracting the blow pin from the mold at said final blowing station, shifting both molds laterally so that the preform blow mold is at said final blowing station and the final blow mold is at a discharge station, inserting the blow pin into the mold at said final blowing station and inserting a pin into the blown article in the mold at said discharge station, opening both molds while supporting the blown preform on the blow pin at the final blowing station and while maintaining the pin in the blown article at said discharge station, thereby assuring that the blown article is removed from the final mold, shifting both molds laterally so that the preform blow mold is at said preblowing station and the final blow mold is at said final blowing station, and repeating the steps.

3. In a method of blow molding a container having a finished neck portion, the steps of extruding a pendent tubular parison of a blow moldable thermoplastic material from an annular orifice at a preblowing station spaced laterally from a separate final blowing station and simultaneously supporting a previously blown preform on a blow pin at said final blowing station, closing a preform blow mold on the pendent tubular parison at said annular orifice while simultaneously closing a final blow mold on the previously blown preform at the final blowing station, blowing the pendent tubular parison to the shape of the preform blow mold, concurrently compression molding the neck portion to provide a finish on said previously blown preform and blowing the preform to the shape of the final blow mold, retracting the blow pin from the mold at said final blowing station, shifting both closed molds laterally so that the preform blow mold is at said final blowing station and the final blow mold is at a discharge station, inserting the blow pin into the mold at said final blowing station and inserting a pin into the blown article in the mold at said discharge station, opening both molds while supporting the blown preform on the blow pin at the final blowing station and while maintaining the pin in the blown article at said discharge station, thereby assuring that the blown article is removed from the final mold, shifting both open molds laterally so that the preform blow mold is at said preblowing station and the final blow mold is at said final blowing station, and repeating the steps.

* * * * *